July 20, 1943.  G. V. SOPER  2,324,976
BICYCLE SEAT
Filed May 2, 1939

INVENTOR
Gilbert V. Soper
BY
ATTORNEYS

Patented July 20, 1943

2,324,976

UNITED STATES PATENT OFFICE 2,324,976

BICYCLE SEAT

Gilbert V. Soper, Akron, Ohio, assignor to The Firestone Tire & Rubber Company, Akron, Ohio, a corporation of Ohio Application May 2, 1939, Serial No. 271,265

2 Claims. (Cl. 155—5.23)

This invention relates to preformed cushioning means, more especially to molded sponge rubber seats for bicycles, motorcycles, and the like.

Heretofore substantially all seats for motorcycles and bicycles have been made from a metallic base element which has a leather covering thereover that holds felt or hair cushioning means onto the seat. While the felt originally gives some resiliency to the seat, after continued use the felt tends to become hard packed and the seats uncomfortable to the person supported. This is due to loss of resiliency in the felt or matted hair and also to an inherent lack of permanent resiliency in the cushioning material provided.

Thus the problem confronted has not only been to provide a better cushioning material, but also to secure this cushioning material to the seat so that the seat remains comfortable over a long period of time. Of course, the cost of the completed seat must be comparable with that previously made.

The general object of this invention is to provide long-lived, resilient supporting means for seats of the above-identified type, the seat assembly having a low production and assembly cost.

One specific object of the invention is to provide a premolded sponge rubber cushion which is adapted to conform to or mate with the metallic seat base provided to facilitate the assembly of the seat.

The foregoing and other objects will be manifest in the following specification, which will be described specifically with reference to the accompanying drawing in which.

Figure 1:
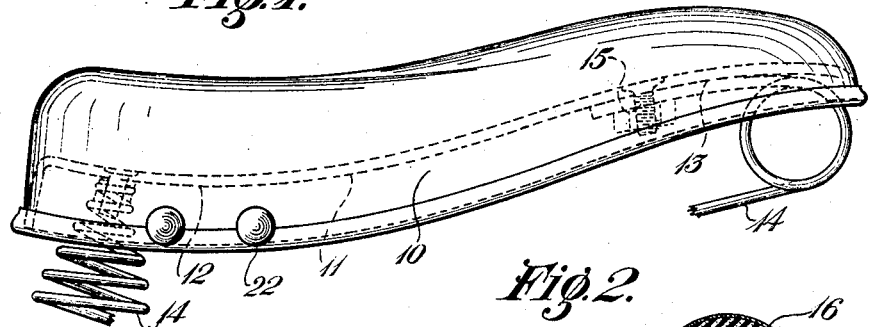
Figure 1 is a side elevation of the completed seat.

Broadly speaking, the present invention resides in forming a sponge rubber cushioning pad that is premolded to conform to the contour of the metallic base member. This rubber pad is provided with flat topped recesses in its undersurface, which recesses are designed to reduce the amount of rubber required in the seat without impairing the resilient support provided by the seat. A further reduction of the amount of rubber in the seat is made by reducing the depth or thickness of the seat at the nose portion thereof since this carries substantially no load. The permanency and favorable properties of the support generally are improved by molding a lip on the edge of the pad which follows the edge contour of the seat and provides 100% support for the seat cover.

Referring specifically to the accompanying drawing, there is shown therein a seat indicated generally by the numeral 10. This seat comprises a metallic base element or seat 11 that has a rear portion 12 and a nose portion 13 which is of reduced width relative to the rear portion 12 and which slopes gradually upwardly from the rear, or seating, portion 12. The base member 11 has spring means 14 attached to it by bolts 15 to provide mounting means for the completed seat 10.

Figure 4:
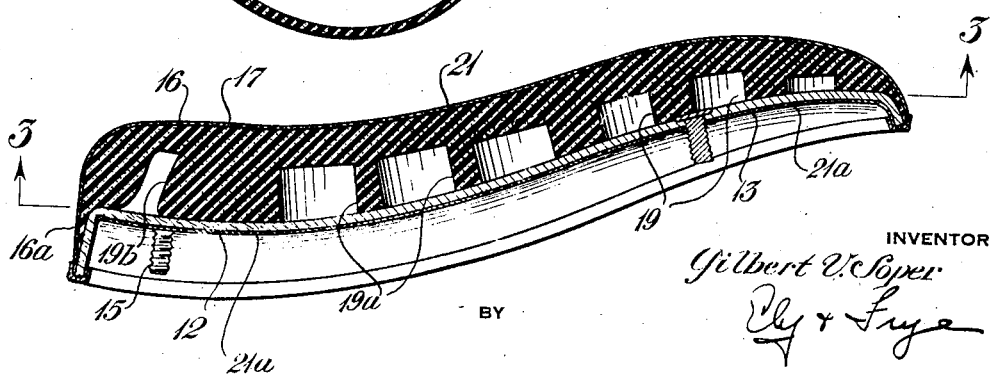
Figure 4 is a longitudinal vertical sectional elevation taken on line 4—4 of Figure 3.

A sponge rubber pad 16, which is molded to conform to the contour of the base 11 is carried thereon. This sponge pad preferably is made from whipped or frothed latex as that type of sponge rubber is found to be softer, longer lived, and more suitable for cushioning purposes than old types of blown sponge rubber. Figure 4 best shows that the sponge pad 16 has a relatively thick base or seating portion 17 that is carried by the rear portion 12 as that bears or carries the most load when a person is sitting upon the seat 10. A reduction in the depth of the pad 16 is made in the portion thereof extending over the nose portion 13. From Figure 2 it is seen that the undersurface of the sponge pad 16 has a plurality of flat topped recesses 19 formed therein. Certain of these recesses 19a have larger diameters than the remainder, as shown. Figure 4 shows that some of the recesses 19b are deeper or extend farther through the sponge pad 16 than the remainder. The deepest recesses 19b are at the rear edge of the seat as that carries relatively low load. Observe that the axes of substantially all of the recesses are all perpendicular to the upper surface of the cushion so that the flat tops of the recesses are parallel thereto. This is a distinct feature of the invention and permits maximum saving of rubber in the construction of the pad. The location of the larger recesses 19a and 19b has been carefully calculated or located so that they are positioned only at the portion of the seat normally carrying a relatively low portion of the seat's load. Thus the portion of the sponge pad carrying relatively high compression load has a substantial thickness of rubber and a minimum volume of recesses thereon whereas the unloaded portion of the seat has a minimum amount of sponge rubber thereon. Obviously, this reduces the volume of rubber required to cover the seat without impairing the supporting and cushioning function of the seat in any manner.

The seat 10 is completed by securing leather or other suitable covering means 21 over the sponge pad 16. This cover 21 extends along the sides of the pad 16 and projects downwardly therefrom so that a cover material 21a on the undersurface of the base 11 can be secured to the protruding edges of the cover 21 and form a complete sheath around the seat. Rivets 22 secure the cover to the base 11.

In placing the cover 21 over pad 16, it usually is drawn tightly over the rubber pad and compresses or distorts the edge portion of the pad. This reduces the diameter of some of the recesses at the rear of the seat (note Figure 4) and brings out a further function of the recesses. That is, they make the sponge easily distortable so that a large force is not required to distort same. Also, the sponge is readily compressible due to its cellular texture and due to the voids or recesses therein.

Figure 2:
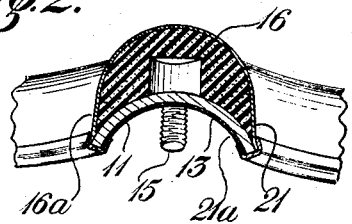
Figure 2 is a vertical section taken on line 2—2 of Figure 3.
Figure 3:
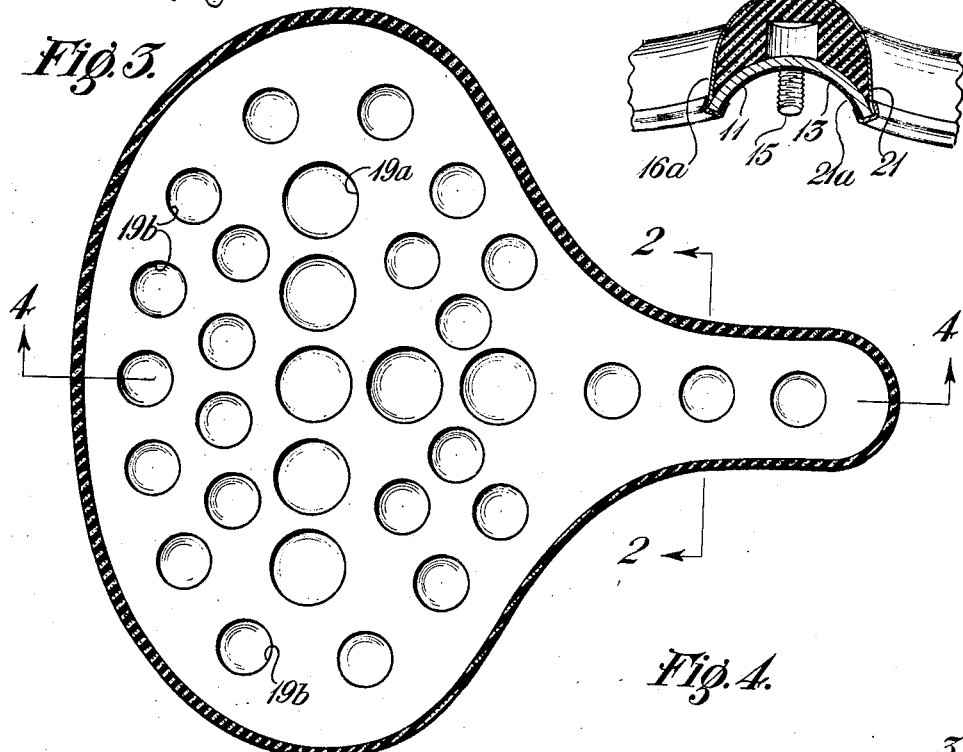
Figure 3 is a horizontal section on line 3—3 of Figure 4 with the seat cover removed.

Figure 2 best shows that the edges of the base member 11 are bent downwardly and slightly outwardly from the remainder of the seat. A lip, or flange 16a is formed on the pad 16 to extend over the edge of the metal base member and this provides a support for the cover 21 while also acting to fill the entire space between the base and cover thereby preventing excessive displacement of the normal shape of the sponge.

Since the rubber pad 16, which preferably is made from cellular rubber produced directly from latex, is premolded to conform substantially to the contour of the base 11 it is under little strain or stress when positioned thereon and the assembly of the seat is simplified. This, coupled with the reduction in volume of rubber used, provides a low cost, long lived seat assembly having improved supporting properties. Thus the objects of the invention are achieved.

While a written description and illustration of one embodiment of the invention is disclosed herein, it will be understood that various modifications can be made without departing from the scope of the invention as defined in the appended claims.

What is claimed is:

1. A bicycle seat or the like comprising a base member having an edge portion that extends downwardly and outwardly from the main seating portion thereof, a sponge rubber seat cushion molded to conform to said base member, said cushion having flat topped recesses in the lower surface thereof, the tops of said recesses being parallel to the upper surface of said cushion, the axes of those recesses adjacent the rear edge of the cushion tilted forwardly to make an acute angle with said base member, the axes of the remaining recesses being perpendicular to the upper surface of the cushion, said cushion having an edge lip extending downwardly therefrom and engaging with the edge of said base member, and cover means securing said cushion to said base member, said cushion filling the entire space between said cover and said base member.

2. A bicycle seat or the like comprising a base member having an edge portion that extends downwardly from the main seating portion thereof, and a sponge rubber seat cushion molded to conform to said base member, said cushion having an edge lip extending downwardly therefrom and engaging with the edge of said base member, said cushion having flat topped recesses in the lower surface thereof, the tops of said recesses being parallel to the upper surface of said cushion, the axes of those recesses adjacent the rear edge of the cushion tilted forwardly to make an acute angle with said base member, the axes of the remaining recesses being perpendicular to the upper surface of the cushion.

GILBERT V. SOFER.